US007197660B1

(12) United States Patent
Liu et al.

(10) Patent No.: US 7,197,660 B1
(45) Date of Patent: Mar. 27, 2007

(54) HIGH AVAILABILITY NETWORK SECURITY SYSTEMS

(75) Inventors: Changming Liu, Cupertino, CA (US); Yan Ke, San Jose, CA (US); Lin Chen, Santa Clara, CA (US); Xiaosong Yang, Sunnyvale, CA (US); Gregory M. Lebovitz, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 511 days.

(21) Appl. No.: 10/186,239

(22) Filed: Jun. 26, 2002

(51) Int. Cl.
*G06F 11/00* (2006.01)
(52) U.S. Cl. .............................. 714/4; 726/11
(58) Field of Classification Search .................. 714/4; 726/11
See application file for complete search history.

(56) References Cited

U.S. PATENT DOCUMENTS

| | | | | |
|---|---|---|---|---|
| 6,078,957 | A | * | 6/2000 | Adelman et al. ........... 709/224 |
| 6,240,533 | B1 | * | 5/2001 | Slemmer ..................... 714/48 |
| 6,243,815 | B1 | * | 6/2001 | Antur et al. ................. 713/201 |
| 2002/0073337 | A1 | * | 6/2002 | Ioele et al. .................. 713/201 |
| 2002/0107966 | A1 | * | 8/2002 | Baudot et al. ............... 709/227 |
| 2002/0188486 | A1 | * | 12/2002 | Gil et al. ....................... 705/7 |
| 2002/0188700 | A1 | * | 12/2002 | Steitle et al. ................ 709/220 |
| 2003/0005125 | A1 | * | 1/2003 | Berthaud et al. ........... 709/226 |
| 2003/0058839 | A1 | * | 3/2003 | D'Souza ..................... 370/352 |
| 2003/0126268 | A1 | * | 7/2003 | Berthaud et al. ........... 709/229 |
| 2003/0226027 | A1 | * | 12/2003 | Marquet et al. ............. 713/200 |

OTHER PUBLICATIONS

Steel, C M "Building a Multisite Web Architecture" IEEE Internet Computing Sep./Oct. 2002 p. 59-66.*
Goddard, S "An Unavailability Analysis of Firewall Sandwhich Configurations" IEEE 2001.*
Nokia Technical White Paper: "The IP Clustering Power of Nokia VPN-Keeping Customers Connected", © 2001.
Rain Technology White Paper: "Rainfinity Internet Reliability Software", Jun. 2000.
Check Point Getting Started Guide, Jan. 2000, pp. 3-19.
Rainfinity™ White Paper: A Technology Discussion of Rainwall™ Enterprise (Rainwall E), Dec. 1999.
Nokia VPN Solutions, Nokia VPN CC5200 Gateway, 2 pgs., © 2001, Mountain View, CA.
Nokia VPN Solutions, Nokia VPN CC5200 Gateway, 2 pgs., © 2001, Mountain View, CA.
Nokia VPN Solutions, Nokia VPN CC5200 Gateway, 2 pgs., © 2001, Mountain View, CA.
Stonesoft StoneGate™, 4 pgs., printed from Internet on Mar. 27, 2001, URL: http://www.stonesoft.com/document/363.html.
Stonesoft White Paper: "Secure Highly Available Enterprise—A White Paper", © 2001, Helsinki, Finland.
Stonesoft White Paper: "StoneGate White Paper", Mar. 2001, Helsinki, Finland.
Stonesoft White Paper: "StoneBeat SecurityCluster White Paper", Aug. 2000, Helsinki, Finland.
Li, et al., Request for Comments Cisco Hot Standby Router Protocol (HSRP), 16 pgs., http://www.ietf.org/rfc/rfc2281.txt?number=2281.
Knight, et al., Request for Comments "Virtual Router Redundancy Protocol", 26 pgs., http://www.ietf.org/rfc/rfc2338.txt?number=2338.

* cited by examiner

*Primary Examiner*—Bryce P. Bonzo
(74) *Attorney, Agent, or Firm*—Harrity Snyder LLP

(57) ABSTRACT

A system and method for a network security system are provided. The method includes providing a master device and a backup device within a cluster of network security devices, providing the backup device with state information for the master device, detecting failure in the cluster and using the state information to recover from the failure.

16 Claims, 7 Drawing Sheets

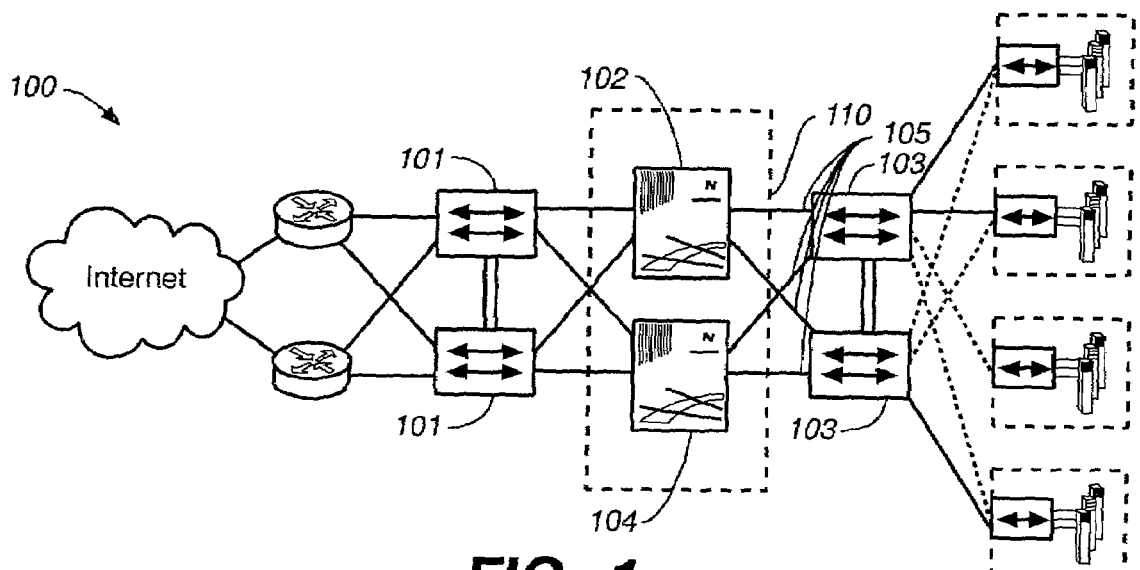
FIG._1
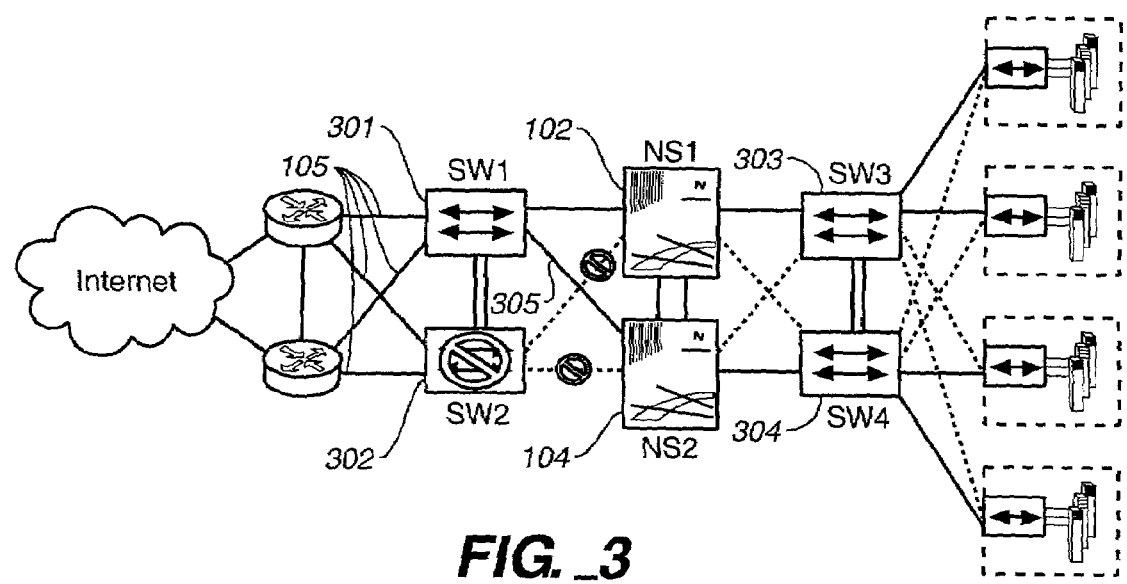
FIG._3

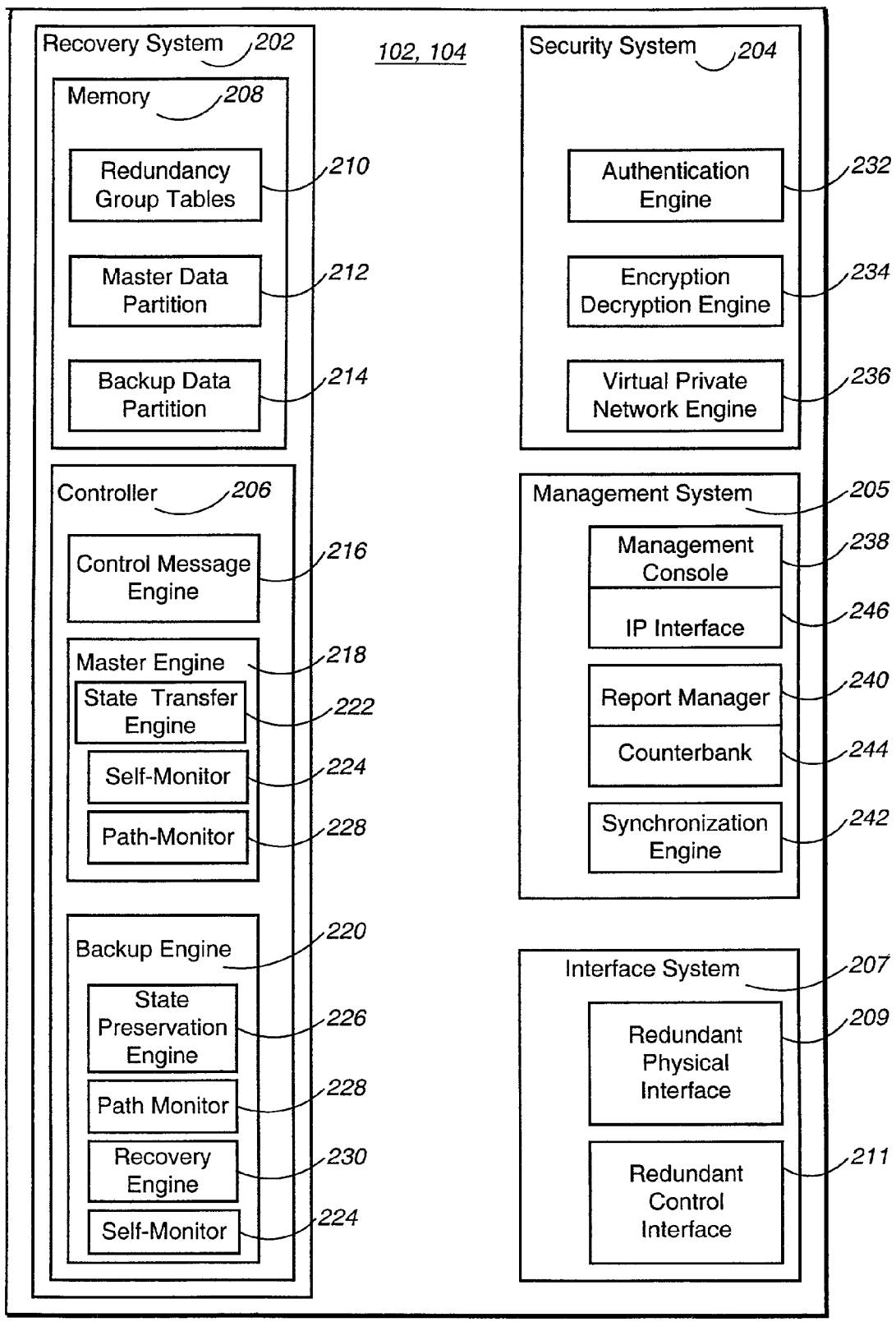
FIG._2

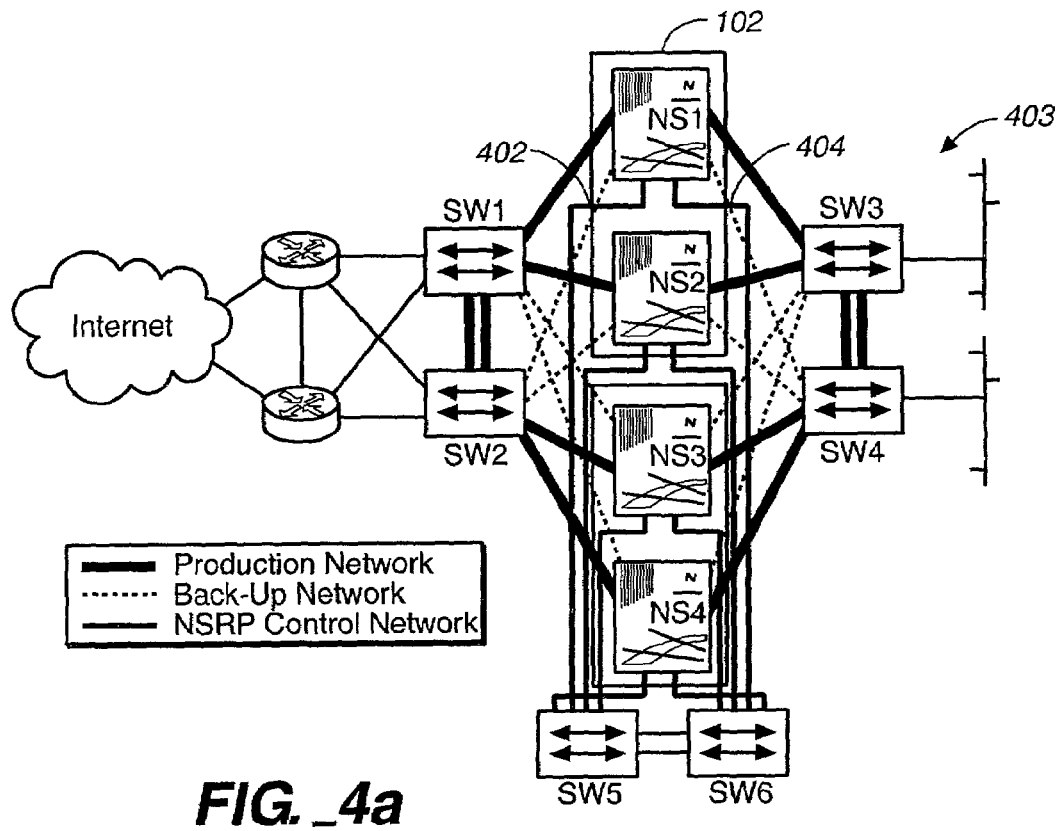
FIG._4a
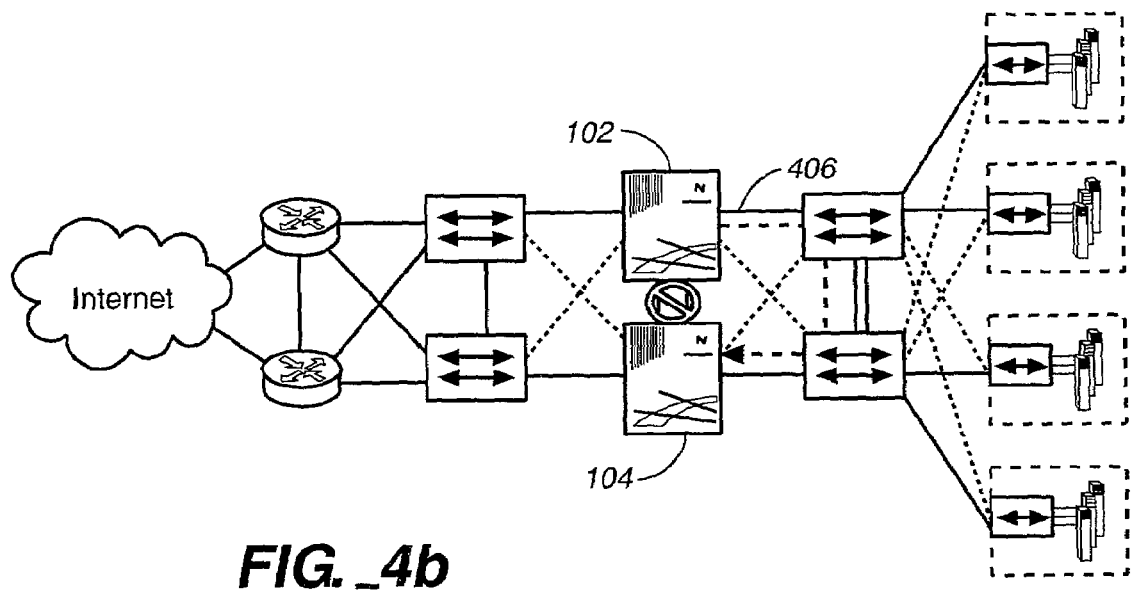
FIG._4b

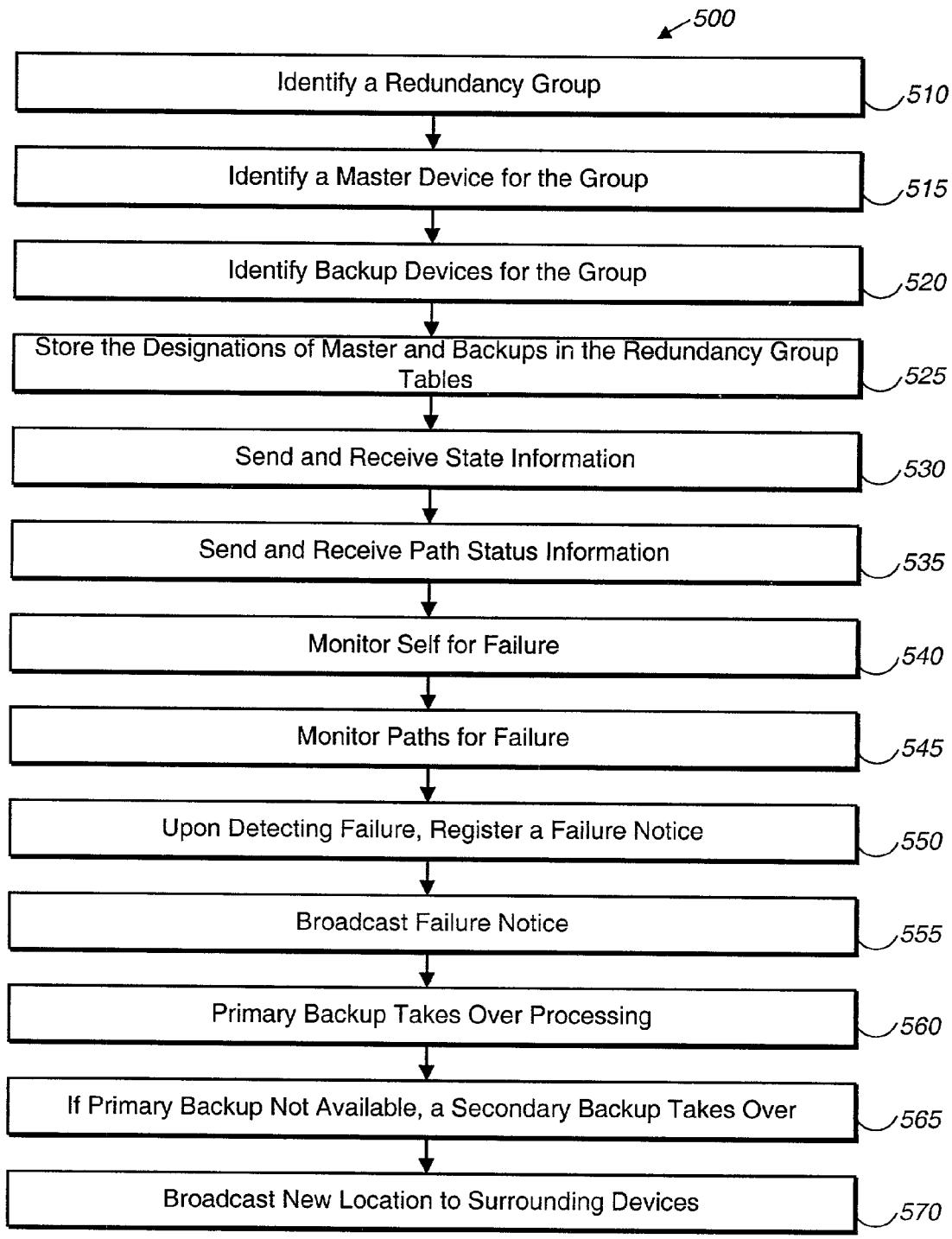
FIG._5

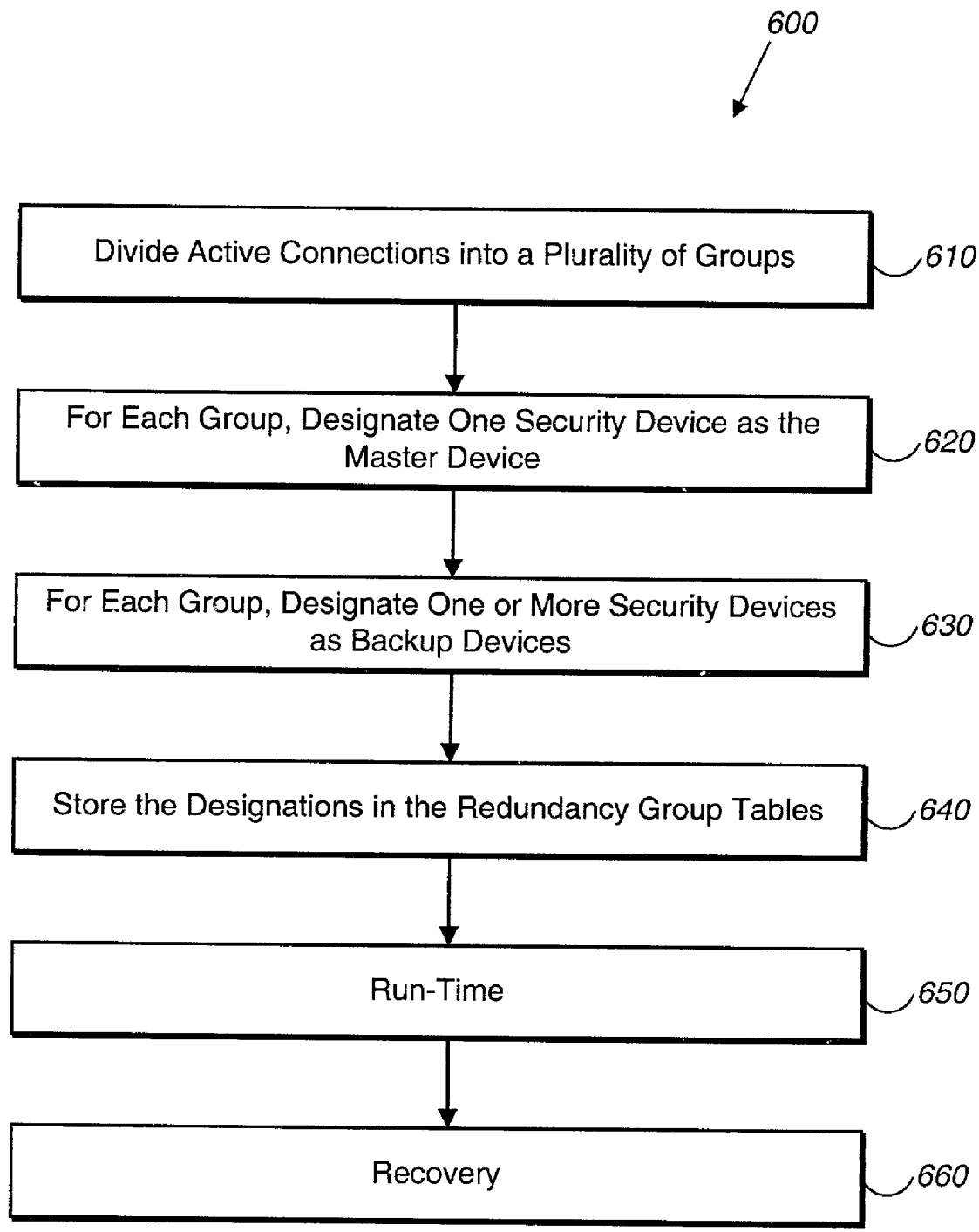
FIG._6

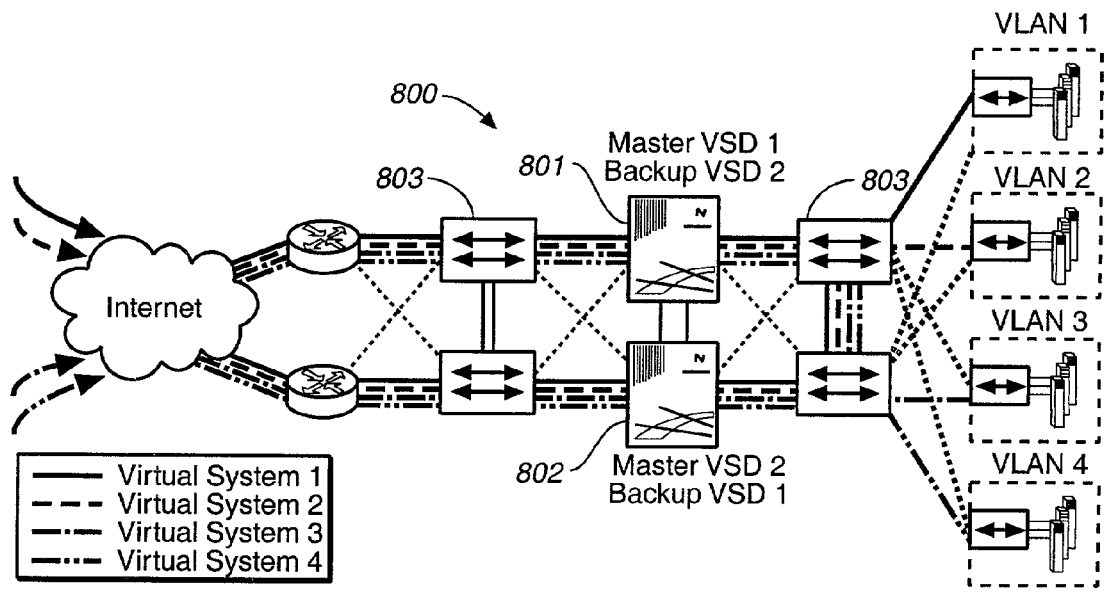
FIG._8
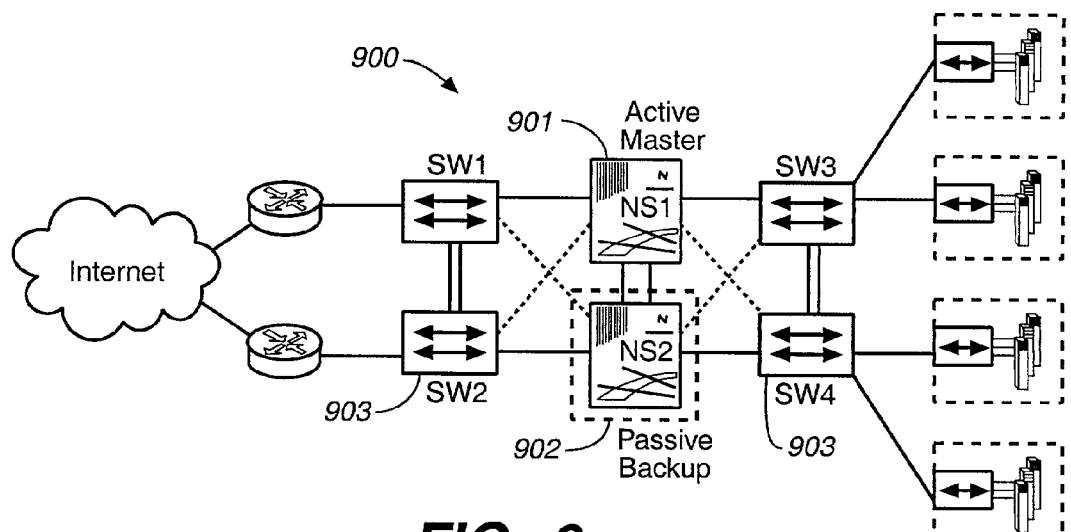
FIG._9

HIGH AVAILABILITY NETWORK SECURITY SYSTEMS

BACKGROUND

The present invention relates to network security systems and to redundancy protocols for network security systems.

There are many emerging trends in the communications world, including the increase in network technology and the proliferation of data networks. One example of a data network is a packet switch communication system. A conventional packet switch communication system includes one or more routers connecting a plurality of users. A packet is the fundamental unit of transfer in the packet switch communication system. A user can be an individual user terminal or another network. A router is a switching device which receives packets containing data or control information on one port, and based on destination information contained within the packet, routes the packet out another port to the destination (or intermediary destination). Conventional routers perform this switching function by evaluating header information contained within the packet in order to determine the proper output port for a particular packet.

The network can be an intranet, that is, a network connecting one or more private servers such as a local area network (LAN). Alternatively, the network can be a public network, such as the Internet, in which data packets are passed over untrusted communication links. The network configuration can include a combination of public and private networks. For example, two or more LAN's can be coupled together with individual terminals using a public network such as the Internet. When public and private networks are linked, data security issues arise. More specifically, conventional packet switch communication systems that include links between public and private networks typically include security measures for assuring data integrity.

To ensure security of communications, network designers have either incorporated security devices, such as firewalls and virtual private networks, and traffic management devices in their systems or enhanced their routers with these functionalities. A firewall is an Internet security appliance designed to screen traffic coming into and out of a network location. A virtual private network provides a secure connection through a public network such as the Internet, between two or more distant network appliances using virtual private networking technology.

High availability is of paramount concern for security devices. Conventional security devices use redundancy to ensure that the system remains available even when one security device fails. Typically, one security device in a redundancy cluster actively process all the production traffic for the cluster while other security devices in the cluster remain on stand-by, poised to take over if needed, but not sharing any of the processing burden. Also, conventional recovery protocols are stateless—i.e. the state of active connections is lost when a device fails. Accordingly, at the time for transition from an active device to another device in a cluster, state information must be rebuilt by the new active device.

In order to achieve high availability, the network security system must be able to respond quickly to device failures without compromising throughput and without service interruption.

SUMMARY OF THE INVENTION

In one aspect, the invention provides a recovery method for a network security system. The method includes providing a master device and a backup device within a cluster of network security devices, providing the backup device with state information for the master device, detecting failure in the cluster and using the state information to recover from the failure.

Aspects of the invention can include one or more of the following features. Detecting failure in the cluster can include monitoring the paths within the cluster. The master device and the backup device can be elected in advance of the failure. The state information can include session information and encryption information.

In another aspect, the invention provides a network security device including ports for communicating on a network and a controller. The controller is operable as a master device for a first set of connections, including transmitting state information for the set of connections to a one or more backup devices and operable as a backup device for a second set of connections, including receiving state information from a master device associated with the second set of connections. The controller detects failure of the associated master device and uses state information received from the associated master device to recover from the failure.

Aspects of the invention can include one or more of the following features. The ports for communicating on a network can include redundant network ports.

In another aspect, the invention provides a network security system including a master device configured to support connections including maintaining state information, and sending the state information to backup devices. The system includes a backup device configured to receive state information, to detect a failure of the master device, and to use the state information to recover from the failure.

Aspects of the invention can include one or more of the following features. The master device and the backup device each can contain all the control information necessary to support the connections. The master device and the backup device can include a messaging engine for communicating state information between the two. The messaging engine can include redundant messaging interfaces for transmitting and receiving control messages to and from other network security devices. The master device and the slave device can include an out-of band interface for communicating control messages.

In another aspect, the invention provides a method for increasing throughput of network security devices. The method includes providing a network device connected to a plurality of network devices divided into a first and second group and configuring the network device to support connections within the first group and backup connections within the second group.

In another aspect, the invention provides a network security device including ports for communicating on a network and a controller configured to support a first group of network connections and backup a second group of network connections.

The invention can be implemented to realize one or more of the following advantages. A cluster of redundant security devices can be used to achieve high availability. The cluster can be leaderless so that no one device is a single point of failure. The cluster can contain redundant paths and control interfaces for higher availability. Control messaging for the cluster can occur out-of-band from the production traffic.

A security device is provided that can self-detect its own failures and alert the rest of the cluster before stepping down from its role. The security device can also monitor the status of other devices for quicker detection of failures.

The security device can employ an active—active configuration to optimize throughput and increase the tolerance to burst traffic. The security device can be designated as backup for a set of connections and can simultaneously act as master for another set of connections.

When the security device is configured as a backup device, the configuration can be elected in advance of failure for quicker recovery. The state of active connections can be preserved during device failure for quicker recovery from failures. Upon transitioning into master status, a backup device can broadcast its address for faster network convergence. Configuration changes made to one device can automatically propagate to other devices within the cluster. A failed device can automatically reinstate itself back into the cluster.

BRIEF DESCRIPTION OF THE DRAWINGS

FIG. 1 shows a network security system.

FIG. 2 shows a network device of the network security system of FIG. 1.

FIG. 3 shows redundant paths within the network.

FIGS. 4a and 4b show redundant control messaging within the network.

FIG. 5 shows a protocol flow for stateful recovery.

FIG. 6 shows a protocol flow for an active—active configuration.

FIG. 8 shows the network security device of FIG. 2 in a security gateway application.

FIG. 9 shows the network security device of FIG. 2 in a transparent security gateway application.

DETAILED DESCRIPTION

Terminology

Figure 7:
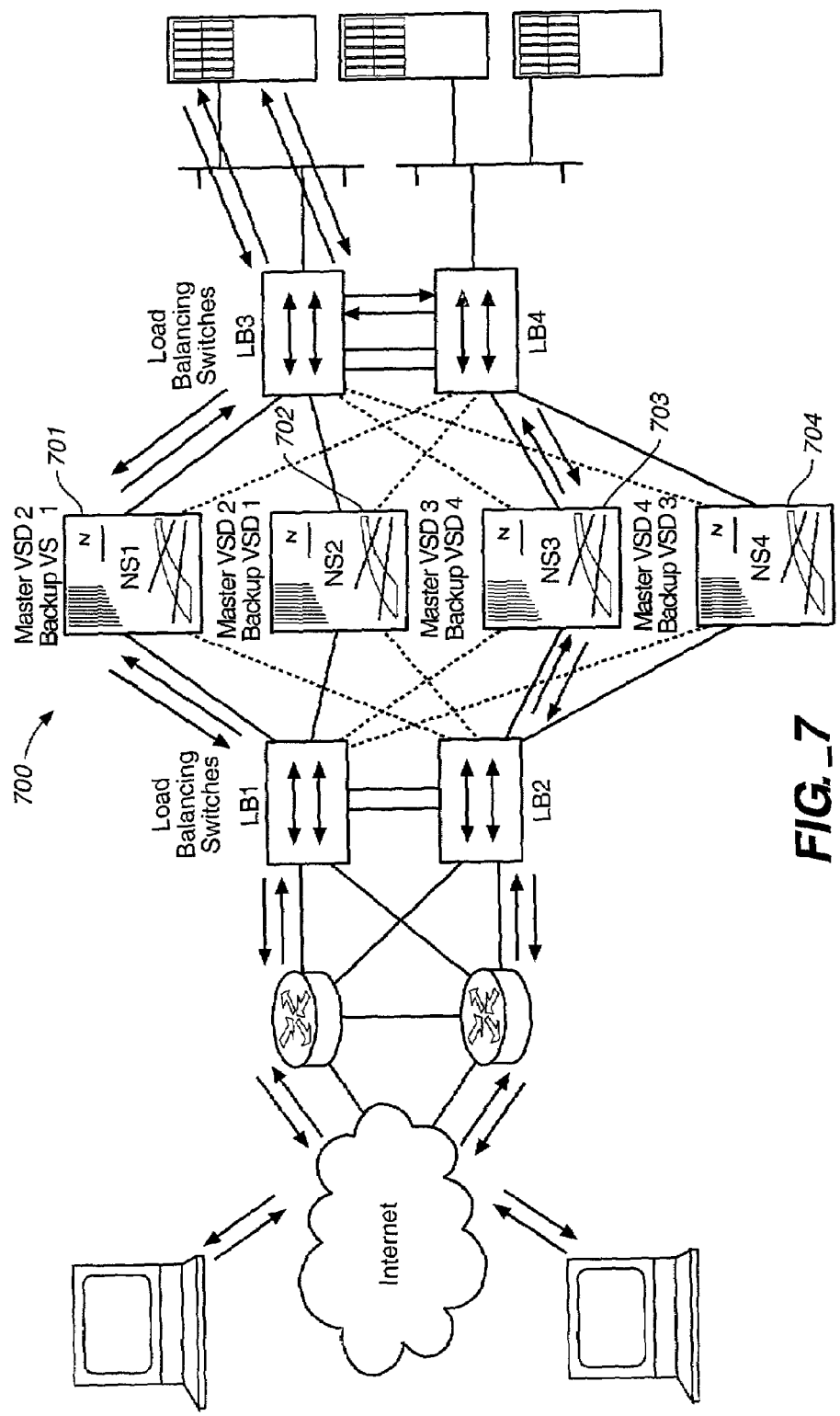
FIG. 7 shows the network security device of FIG. 2 in a firewall application.

As used herein, "network security system" refers to a security system that connects a plurality of users using public or private networks (e.g. the Internet) by way of one or more switches. The network security system includes one or more security devices.

As used herein, "network security device" refers to a device that performs routing functions as well as security functions such as access control, IP security encryption, network address translation, and traffic shaping.

As used herein, "cluster" or "cluster of network security devices" refers to a group of two or more network security devices that support each other to provide services. If one device in the group fails, another device can take over the processing of the failed device.

System Architecture

FIG. 1 shows a network security system 100 that contains a cluster 110 that includes security devices 102, 104. A first pair of switches 101 connects the cluster 110 to a public network. A second pair of switches 103 connects the cluster 110 to a plurality of users. A switching fabric 105 connects each switch or device to the adjacent switches or devices.

Unlike conventional systems, the network security system 100 provides full connection preservation during failure and recovery. For example, an FTP session that is 75 minutes through an 80-minute download does not need to reconnect during a failure. The functionality of the system never disappears, regardless of the types of failures that may occur. Even in the unlikely event of two simultaneous device failures on opposite sides of the network (e.g. in security device 102 and switch 101 of FIG. 1), the active connections are maintained.

As shown in FIGS. 1 and 2, a security device 102 includes a recovery system 202, a security system 204, a management system 205 and an interface system 207. The recovery system 202 provides failure detection and stateful recovery. The security system 204 provides authentication, encryption-decryption and other network security functions. The management system 205 provides a user interface for administrative set-up and control of the security device as well as facilitates synchronization among security devices within a redundancy group. Interface system 207 includes traffic and control interfaces for the security device.

Recovery System

The recovery system 202 has a memory 208 and a controller 206. Memory 208 contains a redundancy group table 210, a master data partition 212 and a backup data partition 214. Each security device 102 is assigned to one or more redundancy groups and each redundancy group is assigned to host a certain set of connections. Within each redundancy group, one security device is designated the master, another security device is designated the primary backup, and the remaining security devices in the redundancy group are designated as secondary backups. The designation of security devices for a group is discussed in greater detail below.

A given security device 102 can be designated as the master device for one redundancy group, and a backup device (primary or secondary) for a different redundancy group. The master data partition 212 stores state information for the set of connections for which a given security device is acting as master device (this set of connections is henceforth referred to as the "master connections"). The backup data partition 214 stores state information for the set of connections for which the security device is acting as backup (this set of connections is henceforth referred to as the "backup connections").

The controller 206 is configurable to perform high availability functions such as mirroring, state preservation, failure-detection and load-sharing. The controller includes a control message engine 216, a master engine 218 and a backup engine 220.

The control message engine 216 sends and receives control messages. Control messages are the various messages that devices 102, 104 send back and forth to one another to keep a cluster 110 (i.e., a redundancy group) running respond to any outages. Control messages can contain state information that allows backup devices to maintain synchronization with their corresponding master devices. State information includes all established security associations and keying material so even site-to-site and remote access virtual private network connections can be maintained during a failure. Policies and configurations are also synchronized across the cluster 110 so each security device in the cluster 110 knows the job it is to perform should it become a master device. There is no fixed brain of the system. Each security device automatically determines a configuration to fulfill its respective role in the cluster (i.e., act as a master, a backup or a secondary backup for the redundancy group). Control messages can also contain path status information (success or fail) that allows each security device within the cluster 110 to independently detect and respond to device failures.

The master engine 218 performs master functions such as transmitting state information, and detecting and registering device failures. The master engine 218 has a state transfer engine 222, a self-monitor 224 and a path monitor 228.

The state transfer engine 222 monitors the state of the master connections and sends state information updates to the control message engine 216.

The self-monitor 224 detects local failures such as the loss of Ethernet link connectivity due to cable, port, or adjacent device failure. The self-monitor 224 outputs failure notices to the control message engine 216. If all paths are healthy, the self-monitor 224 can output success notices to the control message engine 216.

The path monitor 228 detects failures of other devices within the cluster 110 (i.e., not local failures). The path monitor 228 contains a failure threshold parameter that defines the threshold for what constitutes a "failure" for other devices or paths in the system. The failure threshold parameter can be adjusted to varying levels of sensitivity. For example, the path monitor can be set to detect datalink (Layer 2) failures in Ethernet connectivity or network (Layer 3) failures in IP connectivity.

The backup engine 220 is configured to receive updates on the state of the backup connections and operates to take over processing of the connections (i.e., the connections backed up on the backup device) should the master device for a given redundancy group fail. The backup engine 220 has a state preservation engine 226, a self-monitor 224, a path monitor 228, and a recovery engine 230.

The state preservation engine 226 receives control messages containing state information and stores the received state information in the backup data partition 214 of memory 208.

As described above, the self-monitor 224 detects local failures such as the loss of Ethernet link connectivity due to cable, port, or adjacent device failure. The self-monitor 224 outputs failure notices to the control message engine 216. If all paths are healthy, the self-monitor 224 can output success notices to the control message engine 216. In the event of a failure, the self-monitor 224 also detects reset conditions, such as when the failure mode has been corrected. Upon correction, the security device may be reconfigured to an original (non-failure mode) configuration.

As described above, the path monitor 228 detects failures of other devices within the cluster 110. The path monitor 228 also detects reset conditions, such as when the failure mode has been corrected. Upon correction, the security device may be reconfigured to an original (non-failure mode) configuration.

The recovery engine 230 of security device 102 responds to a failure of another device for which the given device is a backup. The recovery engine 230 retrieves state information from the backup data partition 214 and enables a given backup device as a new master device for the connections associated with a given redundancy group. To speed up network convergence, the recovery engine 230 also broadcasts the address of the new master to the other devices in the redundancy group.

Security System

The security system 204 performs security functions such as authentication, encryption and tunneling. The security system 204 contains an authentication engine 232, an encryption/decryption engine 234 and a virtual private network engine 236. These components can be implemented using conventional network security techniques such as disclosed in commonly owned and co-pending U.S. patent application Ser. No. 09/967,893 ("Internet Security System"), the contents of which are incorporated by reference.

In one implementation, the security devices 102, 104 are solid state, purpose built, ASIC-based systems. In one implementation, the security devices 102, 104 do not include disk drives or standard desktop operating systems so they do not need maintenance. There is no need to pull a device out of service to apply a patch, upgrade to a larger device, add more memory, or update to a faster processor, as is the case with security systems that run on standard workstations and commercial operating systems. Optionally, the devices can have redundant hardware such as redundant processor cards, power supplies and fans that can be hot-swapped if one should fail.

Management System

Referring to FIG. 2, security device configuration and controls can be accessed from a graphical, point-and-click management console 238 accessible from any standard browser. Alternatively, a command line interface can be used.

The security device also provides a report manager 240 with reporting capabilities. The report manager 240 can include counters 244 that increment/decrement each time a security device 1) transitions to a specific state (e.g., transitions to master or inoperable), 2) encounters a conflict for master or primary backup status, or 3) fails to receive a "Hello" message from a partnering device. The reports can be remotely accessed and exported securely.

i. Automatic Configuration Synchronization

Each security device includes a synchronization engine 242 for automatic configuration synchronization with other security devices within the cluster 110. Configuration changes made to one security device automatically propagate to all other security devices across the cluster.

ii. Fine Grain Control and Tuning

Each security device also provides for fine grain control and tuning. Each security device maintains an IP interface 246 with unique management IP addresses that can be accessed regardless of the security device's current state within the cluster 110. Unless a failure occurs, ports remain link up on backup devices, so a management IP address may be reachable for administrative purposes. No devices within the cluster sit dark or inaccessible. This can be important when administrators need to change cluster settings or priorities unique to each device, or perform trouble shooting from a particular device's perspective.

Detailed preferences for each device within a backup group may be set to control which devices are most likely to become master, primary backup, and backup. This level of control provides the administrator with more options when architecting their network solution.

iii. Self Healing

Once a security device has failed, the security device can automatically perceive corrections in the network and later reinstate itself as an operational member of the redundancy group. A security device enters the inoperable state when it is no longer able to adequately perform its role as a group master, backup, or primary backup. For example, a transition may occur when path monitor thresholds have been surpassed for a given path. While in inoperable mode, a security device continues to run its path monitors, trying to regain a healthy status. The security device also continues to notify the other group members of its status and receives and stores state information. Once path monitors confirm that all systems are again fully functional, the device can transition back into a role within the redundancy group.

Interface System i. Redundant Physical Interfaces and Paths

Security devices 102, 104 include redundant physical interfaces 209 for connection to the switching fabric 105. Referring now to FIGS. 1 and 3, the switching fabric 105 of network security system 100 provides redundant paths between adjoining switches and devices. In conventional systems, security devices are connected to switching fabrics using only one link each via a single interface. However, in such cases, a failure in the adjacent switching fabric can render the device inoperable.

In contrast to conventional systems, security devices 102, 104 support redundant physical interfaces so they may remain active and functional even when a device, cable, or port in the adjacent switching fabric fails. By way of example, consider the scenario illustrated in FIG. 3 where switch 302 has failed. Using path monitoring, security device 104 detects the loss of its link to switch 302. Knowing that its link (i.e., link 305) to switch 301 is operational, the security device 104 diverts traffic using switch 301 instead. By simply choosing the backup path, security device 104 remains active in processing its share of the network load, and network performance continues without degradation, assuming switch 301 can support the total bandwidth.

Redundant physical interfaces allow the network security system to remain operational, enforcing network security and maintaining optimal throughput, even when failures in the surrounding topology occur.

ii. Redundant Control Interfaces

Because accidental interruption to the control messaging could be interpreted by cluster 110 participants as a cluster member's failure, the security devices 102, 104 includes redundant control interfaces 211. FIG. 4*a* shows two separate physical control interfaces 402 and 404 connecting security device 102 to each of the other security devices in the system. If one interface 402 fails, all messages will be redirected to interface 404, and vice versa. The control interfaces can be implemented in any way, such as by a direct connection or by a single Layer 2 switch. For more complete redundancy, a pair of switches can be employed, so that each interface can be connected to a different switch. As shown in the FIG. 4*a*, if any one cable, port, or switch fails, the control messages are re-routed to the redundant interface and the cluster 110 will experience zero disruption.

The security devices 102, 104 also can support a secondary path in the event that both control interfaces fail. FIG. 4*b* shows a failure of both control interfaces connecting security devices 102 and 104. When this occurs, messages can instead be sent across an operable in-band link 406.

Control messaging can occur out-of-band so that the production network traffic remains un-congested by management traffic. In addition, keeping the control messages on a separate physical network provides tighter security above and beyond those messages being encrypted and authenticated. The ability to use two physical interfaces for transmitting control messages, and to fail-over seamlessly between them, ensures maximum uptime and reliability for cluster operation.

Control messages can also be encrypted to protect sensitive information that should be kept private as it traverses the control network. Encryption also serves as a form of authentication by assuring devices that the control messages they receive really are from valid cluster members. Encryption can include synchronizing all of the configuration and keying material, and all the cluster negotiation and notification messages.

Recovery

FIG. 5 shows the protocol flow 500 for stateful recovery. The protocol includes an initialization stage, a run-time stage, and a recovery stage.

Initialization includes the steps of identifying a redundancy group (step 510), identifying a master device for the group (step 515), identifying primary and secondary backup(s) for the group (step 520) and storing the designations and associated connections of master and backups in the redundancy group tables 210 in memory (step 525). By pre-electing a next master before a failure actually occurs, the time required to recover is only slightly longer than the time required to detect an original master's inability to process data.

During run-time, the security device sends and receives state information using the control message engine 216 (step 530) and sends and receives path status information using the control message engine 216 (step 535).

During run-time, the security device also monitors the cluster for device failures. The self-monitor 224 detects failure of the security device such as loss of Ethernet connectivity (step 540). Additionally, the path monitor 228 checks for failure of other security devices (i.e., by detecting path failures) within the cluster 110 (step 545).

Upon detecting failure, the security device shifts into recovery mode. The path monitor 228 registers a failure notice (step 550) and the control message engine 216 broadcasts the failure notice to the backup devices (step 555). The broadcast prompts the primary backup to immediately take over processing of the active connections (step 560). If the primary backup device is not available, another backup device is designated as the new master device (step 565).

The new master device broadcasts a packet notifying the surrounding devices of the change in master devices (e.g., the new IP/MAC location) (step 570). Upon seeing the broadcast, the surrounding devices update their memory with the new configuration for the group.

Active/Active Configuration

The network security device 102, 104 also supports an active—active configuration, a load-sharing protocol that can increase throughput. Active-active configuration allows for a single device to operate in multiple backup groups simultaneously. Each device may act as a master in one redundancy group, while simultaneously serving as a backup in other redundancy groups. Referring back to FIG. 1, security device 102 can be configured to serve as master for a first set of active connections but as backup for a second set of active connections. Likewise, security device 104 can be configured to serve as backup for the first set of active connections, and master for the second set of active connections. In this way, the active workload is shared by the two security devices.

The active—active configuration enables the creation of a plurality of virtual security devices. A virtual security device provides security protection for a series of connections. The device is virtual, in that a single physical security device can support many virtual security devices. A Virtual Security Device (VSD) group is a set of physical devices that collectively comprise a single VSD. One physical device acts as the master of the VSD group. The virtual security interface (VSI) of the VSD is bound to the physical interface of the master. The other physical device(s) acts as the backup. If the master device fails, the VSD fails over to the backup and the VSI binding is transferred to the physical interface on the backup, which is instantly promoted to master. By grouping two devices into two VSD groups, with each physical device being the master of one group and the backup in the other, both devices can actively process traffic as masters while backing up each other in the event of a failover.

In one implementation, the user can configure up to 8 logical device groups (e.g., Virtual Security Device (VSD) groups) in a cluster. Each VSD group runs a Hello protocol to elect a physical device as the master to represent the group. Other devices in the group are backups for the master. Among the backup devices, a device will be elected as the primary backup, which will immediately become the master should the current master fail.

FIG. 6 shows a protocol flow for an active—active configuration. First, the active connections are divided into a plurality of groups (step 610). Then, for each group, one security device is designated as the master (step 620), and one or more security devices are designated as backup devices (step 630). The designations are stored in the redundancy group tables (step 640). As noted above, a security device can serve as master in some groups and a backup in other groups.

Thereafter, the device can enter the runtime and recovery phases as appropriate. The run-time (step 650) and recovery (step 660) stages are described above with respect to FIG. 5.

Load Balancing

The security device 102, 104 also supports load-balancing of network traffic. Specialized load balancing switches, such as those from Alteon, Extreme, Foundry, Riverstone or ArrowPoint, can be used to rapidly and evenly distribute traffic across the cluster 110. For example, if four devices exist in the security layer and process an average of N connections per second, load balancing seeks to constantly maintain an allocation of N/4 concurrent connections per second to each device and makes the four devices look like one device to both the outside and inside world. Unlike conventional systems, the security device 102, 104 can preserve the load balancing distributions during a device failure.

EXAMPLE 1

Firewall

FIG. 7 shows a security device in a firewall 700 that can exceed the 2 Gpbs threshold even during device failures, while also providing load balancing and stateful recovery.

The firewall 700 employs an active—active configuration. FIG. 7 shows four redundancy groups labeled virtual security devices (VSD) 1–4. Security devices 701 and 702 form a first mirror pair (redundancy group) and security devices 703 and 704 form a second mirror pair (redundancy group). Within each mirror pair, state information is exchanged and path monitors are used to monitor the redundant paths connecting the security devices.

The firewall 700 may act as one single firewall for a set of internal networks, or may act as a multi-customer managed firewall.

EXAMPLE 2

Security Gateway

FIG. 8 shows security device in a security gateway 800 that performs both firewall control and IP security virtual private network functions. Commonly-managed switches 803 may be used on both sides of the security devices 801, 802. The switches 803 can use an 802.1Q trunk in order to forward packets from different VLAN's between them for either of the devices 801, 802.

FIG. 8 depicts the security gateway 800 running in an Active/Active configuration and providing stateful recovery. More specifically, security device 801 is a master for VSD1 and a backup for VSD2. Similarly, security device 802 is a master for VSD2 and a backup for VSD1. The security devices may act as one security gateway for one set of internal networks, or may be employed to enable a multi-customer managed firewall and VPN solution.

EXAMPLE 3

Transparent Security Gateway

FIG. 9 shows a security device used in a transparent security gateway 900. A transparent security gateway is a security gateway that performs IP forwarding but does not perform address translation functions. The transparent security gateway 900 hides the existence of the security devices 901, 902 and simply acts like a securing bridge or a security bump in the wire. Common managed switches 903 may be used on both sides of the security devices 901, 902. The switches 903 have the capability to forward packets between them for either of the security devices 901, 902. The security devices 901, 902 can act as one security gateway for one set of internal networks. The security devices run in Active/ Passive mode, though each will have its own primary IP and MAC addresses from which to perform IP Tracking. Security device 901 is the master, while security device 902 operates as a hot standby, remaining synchronized with all configurations and stateful updates, but bearing no network load. This topology protects against any single point of failure in the network, though it does not allow for load sharing. This topology also enables IP addresses to be conserved and to have one subnet spanning the internal and external sides of the devices 901, 902.

What is claimed is:

1. A recovery method for a network security system, the method comprising:
   providing a master device and a backup device within a cluster of network security devices;
   providing the backup device with state information for the master device, the state information relating to an ongoing set of connections through the master device and the state information including session information and keying material associated with secure remote connections;
   communicating control messages relating to a failure state of the master device and the backup device over an out-of-band connection and, when the out-of-band connection fails, communicating the control messages over an in-band connection;
   detecting failure in the cluster based on the control messages; and
   using the state information to recover from the failure by recovering the ongoing set of connections at the backup device, wherein the master device and the backup device are configured to simultaneously act as a backup device and a master device, respectively, for an additional set of ongoing connections.

2. The method of claim 1 wherein detecting failure in the cluster comprises monitoring paths within the cluster.

3. The method of claim 1 wherein the master device and the backup device are elected in advance of the failure.

4. The method of claim 1, wherein the state information relates to an ongoing file transfer protocol (ftp) connection.

5. The method of claim 1, wherein the state information relates to an ongoing virtual private network (VPN) connection.

6. A network security device comprising:
   ports for communicating on a network; and
   a controller configured to
      operate as a master device for a first set of connections, including transmitting state information for the first set of connections to one or more backup devices, the state information including session information and keying material associated with secure remote communications;
      communicate control messages relating to a failure state of the master device and the one or more backup devices over an out-of-band connection and, when the out-of-band connection fails, communicate the control messages over an in-band connection; and
      simultaneously operate as a backup device for a second set of connections, including receiving state information from a master device associated with the second set of connections, detecting failure of the associated master device, and using state information received from the associated master device to recover from the failure.

7. The network security device of claim 6 wherein the ports for communicating on the network include redundant network ports.

8. The network security device of claim 6, wherein the state information relates to an ongoing file transfer protocol (ftp) connection.

9. The network security device of claim 6, wherein the state information relates to an ongoing virtual private network (VPN) connection.

10. A network security system comprising:
    a master device configured to support a first group of connections including maintaining state information that relates to ongoing connections through the master device, the state information including session information and keying material associated with secure remote connections with the master device; and
    a backup device configured to receive the state information from the master device relating to the first group of connections, to detect a failure of the master device, and to use the state information to recover from the failure by recovering the ongoing first group of connections, the backup device recovering the state information and detecting the failure of the master device using control messages communicated via out-of-band connections and, when the out-of-band connections fail, communicating the control messages over an in-band connection,
    wherein the master device and the backup device are configured to simultaneously act as a backup device and a master device, respectively, for additional groups of ongoing connections.

11. The system of claim 10 wherein the master device and the backup device each contain control information necessary to support the connections.

12. The system of claim 10 wherein the master device and the backup device include a messaging engine for communicating the control messages.

13. The system of claim 12 where the messaging engine includes redundant messaging interfaces for transmitting and receiving the control messages in the out-of-band connection.

14. The network security system of claim 10, wherein the state information relates to an ongoing file transfer protocol (ftp) connection.

15. The network security system of claim 10, wherein the state information relates to an ongoing virtual private network (VPN) connection.

16. A method for increasing throughput of network security devices, the method comprising:
    providing a network device connected to a plurality of network devices divided into a first and a second group; and
    configuring the network device to support connections within the first group and backup connections within the second group, the backup connections being provided for by receiving control messages that include state information from another network device, the state information relating to ongoing connections in the second group and using the state information to recover from a failure in the another network device without breaking the ongoing connections in the second group, the control messages being communicated over an out-of-band connection, and, when the out-of-band connection fails, the control messages being communicated over an in-band-connection.

* * * * *